United States Patent
Doemling et al.

(10) Patent No.: US 11,538,168 B2
(45) Date of Patent: Dec. 27, 2022

(54) INCREMENTAL SEGMENTATION OF POINT CLOUD

(71) Applicant: Bayerische Motoren Werke Aktiengesellschaft, Munich (DE)

(72) Inventors: Maximilian Doemling, Landshut (DE); Wanli Jiang, Shanghai (CN); Qianshan Li, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 104 days.

(21) Appl. No.: 17/251,078

(22) PCT Filed: Jun. 15, 2018

(86) PCT No.: PCT/CN2018/091437
§ 371 (c)(1),
(2) Date: Dec. 10, 2020

(87) PCT Pub. No.: WO2019/237319
PCT Pub. Date: Dec. 19, 2019

(65) Prior Publication Data
US 2021/0248752 A1 Aug. 12, 2021

(51) Int. Cl.
*G06T 7/11* (2017.01)
*G06T 7/187* (2017.01)
(Continued)

(52) U.S. Cl.
CPC .............. *G06T 7/11* (2017.01); *G06K 9/6218* (2013.01); *G06K 9/6232* (2013.01); *G06T 7/143* (2017.01);
(Continued)

(58) Field of Classification Search
CPC .... G06K 9/6232; G06K 9/6218; G06T 7/143; G06T 7/187; G06T 7/11
See application file for complete search history.

(56) References Cited

U.S. PATENT DOCUMENTS 9,582,939 B2 * 2/2017 Zhang ................... G06V 10/44
10,814,872 B2 * 10/2020 Sofra ................... G05D 1/0212
(Continued)

FOREIGN PATENT DOCUMENTS

CN 103218817 A 7/2013
CN 104764457 A 7/2015
(Continued)

OTHER PUBLICATIONS

Grilli, E. "A Review of Point Clouds Segmentation and Classification Algorithms" The International Archives of the Photogrammetry, Remote Sensing and Spatial Information Sciences, vol. XLII-2/W3, 2017 3D Virtual Reconstruction and Visualization of Complex Architectures, Mar. 1-3, 2017, Nafplio, Greece, pp. 1-6.*

(Continued)

*Primary Examiner* — Mia M Thomas
(74) *Attorney, Agent, or Firm* — Crowell & Moring LLP (57) ABSTRACT

A method for segmentation of a point cloud includes receiving a first frame of point cloud from a sensor; segmenting the first frame of point cloud to obtain a first set of point clusters representing a segmentation result for the first frame of point cloud; receiving a second frame of point cloud from the sensor; mapping the first set of point clusters to the second frame of point cloud; determining points within the second frame of point cloud which do not belong to the mapped first set of point clusters; segmenting the points within the second frame of point cloud which do not belong to the mapped first set of point clusters to obtain a second set of point clusters; and generating a segmentation result for the second frame of point cloud by combining the first set of point clusters and the second set of point clusters.

11 Claims, 10 Drawing Sheets

(51) Int. Cl.
  *G06T 7/143* (2017.01)
  *G06K 9/62* (2022.01)
(52) U.S. Cl.
  CPC .... *G06T 7/187* (2017.01); *G06T 2207/10028* (2013.01); *G06T 2207/30252* (2013.01)

(56) References Cited

U.S. PATENT DOCUMENTS

| | | | |
|---|---|---|---|
| 10,980,447 B2* | 4/2021 | Sinha | G06T 7/277 |
| 2012/0121166 A1 | 5/2012 | Ko et al. | |
| 2015/0379350 A1 | 12/2015 | Li et al. | |
| 2016/0364917 A1* | 12/2016 | Zhang | G06V 20/64 |
| 2017/0023473 A1* | 1/2017 | Wegner | G01S 7/4876 |
| 2018/0136332 A1* | 5/2018 | Barfield, Jr. | G06V 20/58 |
| 2018/0165544 A1* | 6/2018 | Isert | G06T 17/10 |
| 2018/0225515 A1 | 8/2018 | Jiang et al. | |
| 2018/0357891 A1* | 12/2018 | Wang | G08G 1/0129 |
| 2018/0370533 A1* | 12/2018 | Sofra | B60W 30/10 |
| 2019/0310378 A1* | 10/2019 | Ho | G01S 17/89 |
| 2020/0089236 A1* | 3/2020 | Doemling | G06F 9/3891 |
| 2020/0090339 A1* | 3/2020 | Doemling | G06T 7/143 |

FOREIGN PATENT DOCUMENTS

| | | | | |
|---|---|---|---|---|
| CN | 105184852 A | | 12/2015 | |
| WO | WO-2016201670 A1 * | 12/2016 | | G01C 21/3635 |
| WO | WO-2020130301 A1 * | 6/2020 | | G06F 16/587 |

OTHER PUBLICATIONS

Tchapmi, L. "SEGCloud: Semantic Segmentation of 3D Point Clouds" 2017 International Conference on 3D Vision (3DV), pp. 1-11.*
Woo, H. "A new segmentation method for point cloud data" International Journal of Machine Tools & Manufacture 42 (2002) 167-178 (pp. 1-12).*
International Search Report (PCT/ISA/210) issued in PCT Application No. PCT/CN2018/091437 dated Mar. 27, 2019 (three (3) pages).
Written Opinion (PCT/ISA/237) issued in PCT Application No. PCT/CN2018/091437 dated Mar. 27, 2019 (three (3) pages).
Extended European Search Report issued in European Application No. 18922315.9 dated Jan. 5, 2022 (17 pages).
Dube et al., "Incremental-Segment-Based Localization in 3-D Point Clouds", IEEE Robotics and Automation Letters, Mar. 12, 2018, pp. 1832-1839, vol. 3, No. 3, XP055691187, (eight (8) pages).
Owens et al., "Temporally Consistent Segmentation of Point Clouds", Proceedings of SPIE, Jun. 3, 2014, pp. 90840H-90840H, vol. 9084, XP060037171, (16 pages).
Evangelidis et al., "Joint Alignment of Multiple Point Sets with Batch and Incremental Expectation-Maximization", ARXIV.org, Sep. 6, 2016, pp. 1-14, XP081152837, (14 pages).
Husain et al., "Consistent Depth Video Segmentation Using Adaptive Surface Models", IEEE Transactions on Cybernetics, Feb. 2, 2015, pp. 266-278, vol. 45, No. 2, XP011569960, (13 pages).
Whelan et al., "Incremental and Batch Planar Simplification of Dense Point Cloud Maps", Robotics and Autonomous Systems, Sep. 28, 2014, pp. 3-14, vol. 69, XP029151806, (12 pages).
Finman et al., "Efficient Incremental Map Segmentation in Dense RGB-D Maps", IEEE International Conference on Robotics and Automation, May 31, 2014, pp. 5488-5494, XP032650705, (seven (7) pages).
Kumar et al., "Fast Human Segmentation Using Color and Depth", Samsun R&D Institute, Mar. 5, 2017, pp. 1922-1926, XP033258751, (five (5) pages).

* cited by examiner

INCREMENTAL SEGMENTATION OF POINT CLOUD

FIELD OF THE INVENTION

The present disclosure relates in general to the field of the advanced driving assistant system (ADAS) or highly automatic driving (HAD), and in more particular, to a method and an apparatus for segmentation of a point cloud.

BACKGROUND OF THE INVENTION

Automatic vehicle driving has long been the subject of research efforts designed to improve the safety and efficiency of automobile transportation. In recent years, increasingly sophisticated sensors have brought automatic driving systems closer to reality. For example, 3D scanners (e.g. lidar, stereo-camera, time-of-flight camera, etc.) are now widely used in automatic driving systems. Such 3D scanners measure a large number of points on an object's surface, and often output a point cloud as a data file. The point cloud represents the set of points that the 3D scanners has measured. As is known in the art, the point cloud may be used for many purposes, including creating 3D maps, object recognition and object tracking. In order to achieve these purposes, point cloud should first be segmented based on some attributes of the points within the point cloud to obtain clusters of point cloud. The resulting clusters of point cloud can then be described using a suitable model so as to represent a particular object.

Due to some reasons such as the limitation of the field of view of the sensor, one frame of point cloud may not obtain the point cloud of the whole object. Therefore, a plurality of consecutive frames of point cloud, which are obtained by the sensor sequentially in time, are typically used for processing. Conventionally, a point cloud is segmented directly for each frame of point cloud. For example, for the first frame of point cloud, the entire point cloud is segmented using a specific segmentation method. For the second frame of point cloud, the entire point cloud is segmented using a same or different segmentation method, and so on. This approach is not efficient, since for each new frame of point cloud, all points within the point cloud should be calculated for segmentation. Such calculation may consume many hardware resources. In addition, this may lose some potential correlated information among frames of point cloud.

Accordingly, it may be desirable to have an improved method for segmentation of a point cloud which is computationally efficient and resource-saving.

SUMMARY OF THE INVENTION

The present disclosure aims to provide a method and an apparatus for segmentation of a point cloud. Such method and apparatus may utilize potential correlated information among consecutive frames of point cloud and are computationally efficient and resource-saving.

In accordance with a first exemplary embodiment of the present disclosure, there is provided a method for segmentation of a point cloud, comprising: receiving a first frame of point cloud from a sensor: segmenting the first frame of point cloud using a segmentation algorithm to obtain a first set of point clusters representing a segmentation result for the first frame of point cloud; receiving a second frame of point cloud from the sensor; mapping the first set of point clusters to the second frame of point cloud; determining points within the second frame of point cloud which do not belong to the mapped first set of point clusters; segmenting the points within the second frame of point cloud which do not belong to the mapped first set of point clusters using the segmentation algorithm to obtain a second set of point clusters: and generating a segmentation result for the second frame of point cloud by combining the first set of point clusters and the second set of point clusters.

In accordance with a second exemplary embodiment of the present disclosure, there is provided an apparatus for segmentation of a point cloud, comprising: a receiving unit configured to receive a first frame of point cloud from a sensor; a segmenting unit configured to segment the first frame of point cloud using a segmentation algorithm to obtain a first set of point clusters representing a segmentation result for the first frame of point cloud: the receiving unit further configured to receive a second frame of point cloud from the sensor; a mapping unit configured to map the first set of point clusters to the second frame of point cloud; a determining unit configured to determine points within the second frame of point cloud which do not belong to the mapped first set of point clusters; the segmenting unit further configured to segment the points within the second frame of point cloud which do not belong to the mapped first set of point clusters using the segmentation algorithm to obtain a second set of point clusters; and a generating unit configured to generate a segmentation result for the second frame of point cloud by combining the first set of point clusters and the second set of point clusters.

In accordance with a third exemplary embodiment of the present disclosure, there is provided an apparatus for segmentation of a point cloud, comprising: a memory with computer executable instructions stored therein; and a processor, coupled to the memory and configured to: receive a first frame of point cloud from a sensor; segment the first frame of point cloud using a segmentation algorithm to obtain a first set of point clusters representing a segmentation result for the first frame of point cloud; receive a second frame of point cloud from the sensor; map the first set of point clusters to the second frame of point cloud; determine points within the second frame of point cloud which do not belong to the mapped first set of point clusters; segment the points within the second frame of point cloud which do not belong to the mapped first set of point clusters using the segmentation algorithm to obtain a second set of point clusters; and generate a segmentation result for the second frame of point cloud by combining the first set of point clusters and the second set of point clusters.

In accordance with a fourth exemplary embodiment of the present disclosure, there is provided a non-transitory machine readable storage medium having instructions stored thereon that, when executed, cause a processor to implement a method for segmentation of a point cloud.

In accordance with a fifth exemplary embodiment of the present disclosure, there is provided a system for use in a vehicle, comprising a sensor and an apparatus for segmentation of a point cloud.

In accordance with a sixth exemplary embodiment of the present disclosure, there is provided a vehicle comprising a system for use in the vehicle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the present disclosure. Note that the drawings are not necessarily drawn to scale.

FIGS. 3 (a)-(c) illustrate an example of using Signatured Gaussian Mixture Models to represent point clusters within a point cloud in accordance with an exemplary embodiment of the present disclosure.

DETAILED DESCRIPTION

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

The term "vehicle" used through the specification refers to a car, an airplane, a helicopter, a ship, or the like. The term "A or B" used through the specification refers to "A and B" and "A or B" rather than meaning that A and B are exclusive, unless otherwise specified.

A point cloud is a set of data points in space. The point cloud is generally produced by a sensor, which measures a large number of points on the external surfaces of objects around it. Each point within the point cloud may have a three dimensional coordinate (x, y, z) and other information (e.g. the color information, the reflection intensity, the normal direction, etc.). The point cloud may be used for many purposes, including creating 3D maps, object recognition and object tracking. In order to achieve these purposes, the point cloud should first be segmented based on some attributes of the points within the point cloud to determine which points belong to a particular object. Due to some reasons such as the limitation of the field of view of the sensor, one frame of point cloud may not obtain the point cloud of the whole object. Therefore, a plurality of consecutive frames of point cloud, which are obtained by the sensor sequentially in time, are typically used for processing.

Figure 1:
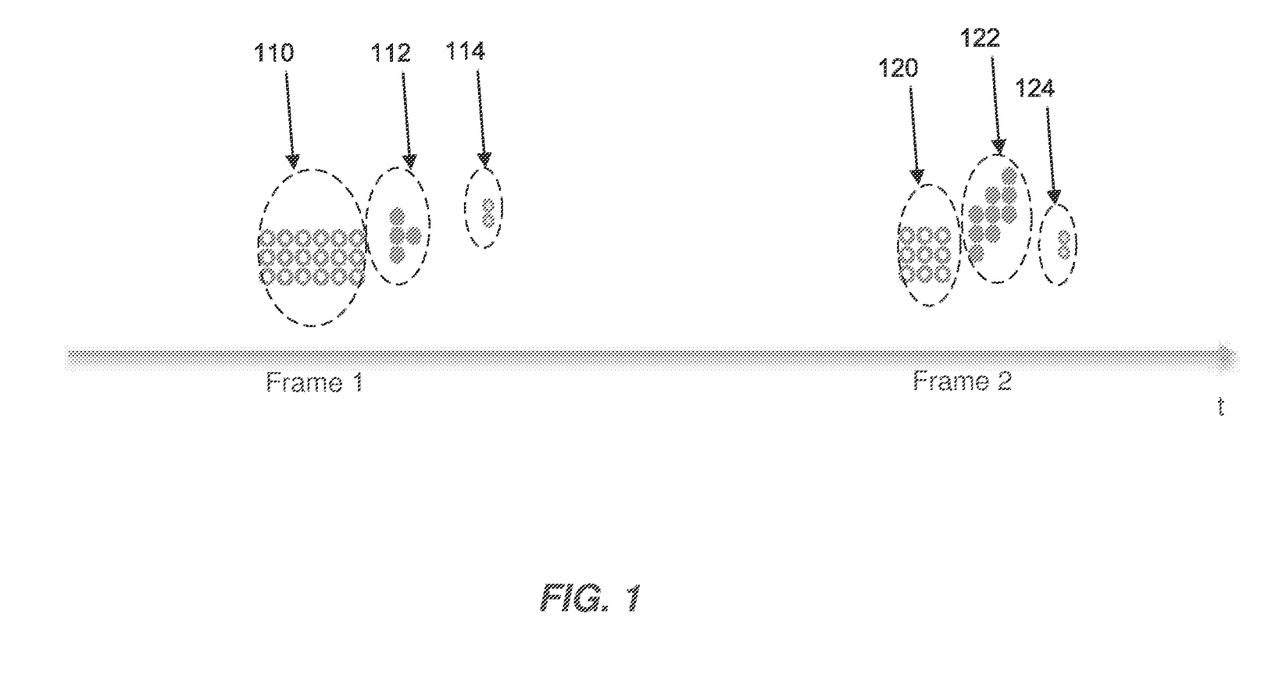
FIG. 1 illustrates an exemplary segmentation of a point cloud in accordance with the prior art.

FIG. 1 illustrates an exemplary segmentation of a point cloud in accordance with the prior art. For ease of explanation, FIG. 1 only shows two frames of point cloud which are obtained by a sensor (e.g. a lidar installed on the top of a vehicle) sequentially in time. It should be noted that the sensor may typically obtain many frames of point cloud every second.

As shown on the left side of FIG. 1, the first frame of point cloud "Frame 1" may be obtained by the sensor at time $t_1$. In Frame 1, only 24 points are depicted for ease of illustration. It should be noted that a frame of point cloud may contain hundreds or thousands of points. In order to segment Frame 1, various well-known segmentation algorithms may be employed. These segmentation algorithms may include the K-means algorithm, the K-NearestNeighbor algorithm, the GMM algorithm and/or the region growing algorithm. After the segmentation, Frame 1 may be segmented into three point clusters which are shown within the dashed circles 110, 112 and 114 in FIG. 1. The first point cluster 110 may include 18 points. The second point cluster 112 may include 4 points. The third pint cluster 114 may include 2 points. Each point cluster may have attributes such as length, width, thickness, orientation, or the ratio of main axes, and may indicate that points within the point cluster belong to the same object.

At time $t_2$, the sensor may, for example, have been rotated for certain degree in the X-Y plane in the Cartesian coordinate system since $t_1$ and may obtain the second frame of point cloud "Frame 2". Frame 2 may also be segmented using abovementioned segmentation algorithms and may be segmented into three point clusters 120, 122 and 124. The fourth point cluster 120 may include 9 points. The fifth point cluster 122 may include 9 points. The sixth point cluster 124 may include 2 points. As can be seen on the right side of FIG. 1, all points within Frame 2 participate in the segmentation process, which may consume many processing resources.

In fact, since the existing sensor may obtain many frames per second, each consecutive two frames of point cloud may have a lot of overlap. For example, points within the point cluster 110 in Frame 1 and points within the point cluster 120 in Frame 2 may partly overlap and actually represent the same object. However, this relationship is not reflected in the approach shown in FIG. 1. In other words, this approach does not account for the potential correlated information among frames of point cloud.

According to the prevent disclosure, an inventive concept is proposed which utilizes potential correlated information among consecutive frames of point cloud and is computationally efficient and resource-saving. This concept is referred to as incremental segmentation of point cloud in the present disclosure.

Figure 2:
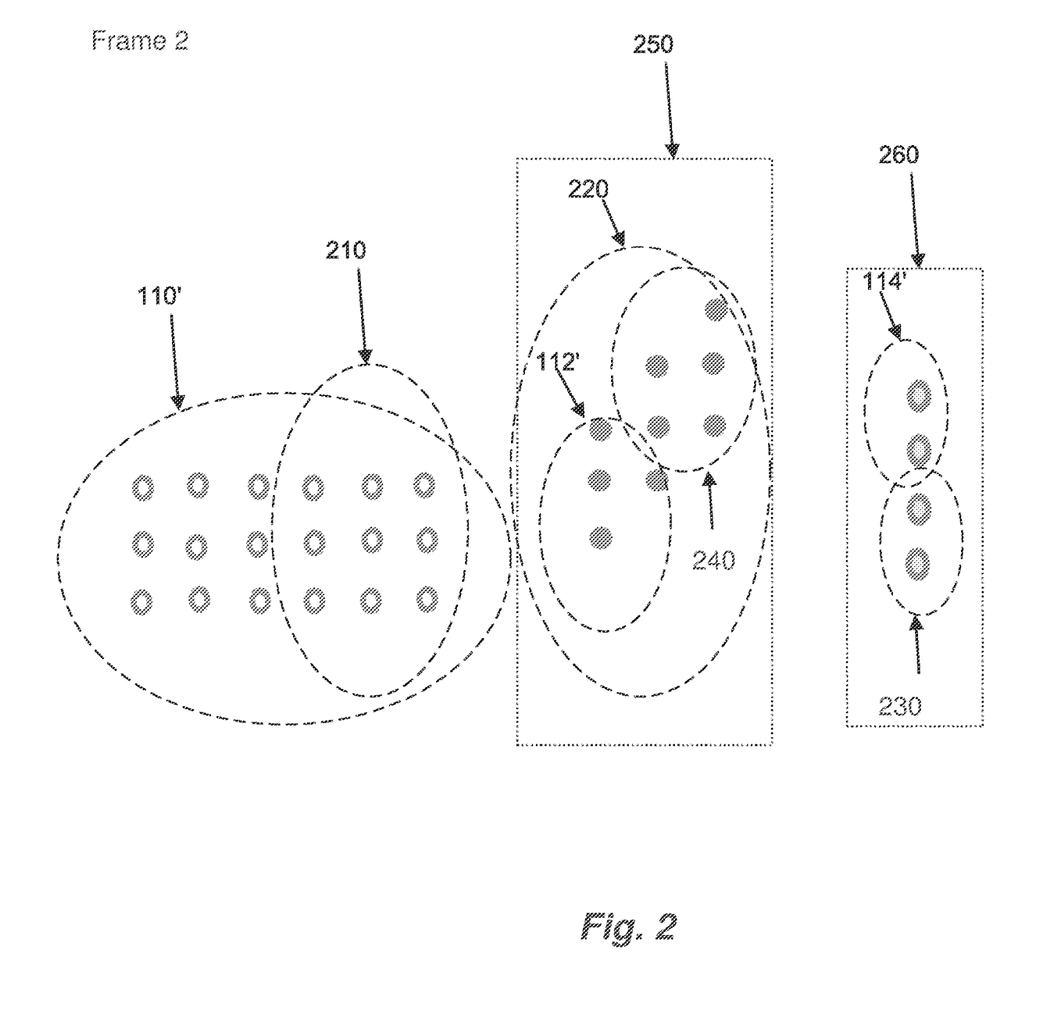
FIG. 2 illustrates an example of incremental segmentation of a point cloud in accordance with an exemplary embodiment of the present disclosure.

FIG. 2 illustrates an example of incremental segmentation of a point cloud in accordance with an exemplary embodiment of the present disclosure. Similar to FIG. 1, Frame 1 may be segmented into three point clusters 110, 112 and 124. After Frame 2 is obtained, the three point clusters 110, 112 and 124 in Frame 1 may be mapped to Frame 2 according to a coordinate transformation. Typically, each point in a frame of point cloud has a three dimensional coordinate (x, y, z) in a Cartesian coordinate system associated with the location of the sensor when it obtained the frame of point cloud. It is possible that the origin for the Cartesian coordinate system of Frame 1 may be different from the origin for the Cartesian coordinate system of Frame 2, e.g. due to the movement of the vehicle. Therefore, in order to map the point clusters in Frame 1 to Frame 2, a coordinate transformation may be performed based on the coordinate information of the points within the point clusters in Frame 1 and the relative relationship between the Cartesian coordinate system of Frame 1 and the Cartesian coordinate system of Frame 2. For example, if the vehicle moves 1 m in the x-direction of the Cartesian coordinate system of Frame 1 between the time when Frame 1 is obtained and the time when Frame 2 is obtained, then the x-coordinate of the points within Frame 1 need to be decreased, for example, by 1 so as to map the point clusters in Frame 1 to Frame 2. In another example, the coordinate information of all points within Frame 1 and Frame 2 may be transformed into coordinate information (e.g., longitude, latitude, altitude) in a common global coordinate system for further processing.

The mapped point clusters are denoted as 110', 112' and 114' in FIG. 2. Points within the dashed circles 210, 220 and 230 are the real points obtained in Frame 2. As shown in FIG. 2, all points within the dashed circle 210 in Frame 2 overlap with the mapped point cluster 110'. Therefore, there is no need to perform segmentation for all points within the dashed circle 210. Four points within the dashed circle 220 overlap with the mapped point cluster 112'. Therefore, only other five points within the dashed circle 220 need to be segmented. No points within the dashed circle 230 overlaps with any mapped point cluster and thus all points within the dashed circle 230 need to be segmented. Totally, only 7 out of 20 points in Frame 2 need to be segmented, which may lead to substantial resource-saving.

After these seven points in Frame 2 have been segmented, there may be five point clusters 110', 112', 240, 114' and 230. It can then be determined whether these point clusters can be merged according to certain rules. For example, since the point clusters 114' and 230 are close to each other and their points have similar flatness, these two point clusters may be merged into one point cluster 260. As another example, the point clusters 112' and 240 are close to each other and their points have similar reflection rate. Therefore, these two point clusters may be combined into one point cluster 250. Finally, there are totally three point clusters 110', 250 and 260 which represent the segmentation result of Frame 2.

In an aspect of the present disclosure, a shape of a point cluster may be approximated by geometric primitives alone or in combination. For example, a point cluster may correspond to a tree along the road in the physical word. The shape of the point cluster may approximate to that of a rectangle primitive as the trunk of the tree and a triangle primitive as the crown of the tree. In an example, the geometric primitives may comprise at least one of: a line segment, an arc segment, a spiral segment, a planar rectangle, a planar triangle, a planar circle/sphere, a planar ellipse, a sphere surface patch, a cylinder surface patch, a 3D cube, a 3D sphere and a 3D cylinder. It is known that any geometry can be represented by geometric primitives alone or in combination.

Moreover, in an aspect of the present disclosure, a shape of a point cluster may be represented by a Signatured Gaussian Mixture (SGM) model. The SGM model is described in detail in the PCT publication WO 2016201670A, which is incorporated herein by reference in its entirety.

As discussed in the publication WO 2016201670A, a method for representing a point cluster may comprise (a) generating a Gaussian Mixture Model for the point cluster; (b) generating a signature for identifying the point cluster; and (c) generating a SGM model for representing the point cluster.

A Gaussian Mixture Model is a type of density model which comprises a number of Gaussian distributions. For example, a typical Gaussian Mixture Model in one dimension may take the form of formula (1) as below:

$$p(x) = \Sigma_{k=1}^{K} \pi_k p(x|k) \quad (1)$$

wherein K is the number of Gaussian distributions contained in the Gaussian Mixture Model, $\pi_k$ is the composition weight of the $k^{th}$ Gaussian distribution, and $p(x|k)$ is the probability density function of the $k^{th}$ Gaussian distribution which is defined by its average $\mu_k$ and covariance $b_k$. In particular, a typical Gaussian distribution (i.e. the probability density function of the Gaussian distribution) in one dimension may take the form of formula (2) as below:

$$p(x) = \frac{1}{\sqrt{2\pi}} \exp\left(-\frac{(x-\mu)^2}{2\sigma^2}\right) \quad (2)$$

wherein $\mu_k$ is the average, and $p_k$ is the covariance.

Thus, generating a Gaussian Mixture Model for a point cluster may involve the process of determining (a) the number of Gaussian distributions contained in the Gaussian Mixture Model, (b) the composition weight of each Gaussian distribution in the Gaussian Mixture Model, (c) as well as the average p- and the covariance $t_k$ parameters for each Gaussian distribution, given the data points which are deemed as satisfying the Gaussian Mixture Model.

Herein, only an example form of a Gaussian Mixture Model and an example form of a Gaussian distribution in one dimension are illustrated. However, Gaussian Mixture Models in two and three dimensions are in similar forms and well known to those skilled in the art.

According to the definition of Gaussian distributions, it is known that the geometric shape of a Gaussian distribution in a two dimensional space resembles that of an ellipse, and that the geometric shape of a Gaussian distribution in a three dimensional space resembles that of an ellipsoid.

In an example, the Gaussian Mixture Model for the point cluster may be generated by using Gaussian Mixture Models of geometric primitives to approximate a shape of the point cluster. It is noted that the shape of the point cluster may be determined by using the geometric information of the point cluster or other information of the point cluster. The Gaussian Mixture Model for the point cluster may be generated by using Gaussian Mixture Models for geometric primitives alone or in combination. As an example, a point cluster has a shape approximating that of a planar ellipse primitive. This shape may be generated by using the Gaussian Mixture Model for the planar ellipse primitive based on geometric parameters of the point cluster. As another example, a point cluster has a shape approximating that of a triangle primitive and a line segment primitive. This shape may be generated by using the combination of a Gaussian Mixture Model for the triangle primitive and a Gaussian Mixture Model for the line segment primitive based on geometric parameters of the point cluster.

A Gaussian Mixture Model of a geometric primitive may comprise one or more Gaussian distributions, with each Gaussian distribution having a specific mean, a covariance and a composition weight. The number of Gaussian distributions in the Gaussian Mixture Model may be selected based on accuracy requirement. The Gaussian Mixture Models for geometric primitives may be expressed by the geometric parameters of the geometric primitives.

The Gaussian Mixture Models for point clusters may be generated for example via a substitution method, i.e., by substituting geometric parameters of geometric primitives for concrete geometric parameters of the point clusters. In the case that a point cluster has a shape approximating that of several geometric primitives in combination, generating the Gaussian Mixture Model for the point cluster may also comprise combining Gaussian Mixture Models for the geometric primitives to generate the Gaussian Mixture Model for the point cluster.

In an example, calculating a Gaussian Mixture Model of a geometric primitive may comprises sampling the geometric primitive and then using data points resulting from the sampling to determine parameters of each Gaussian distribution, such as the specific mean, covariance and composition weight thereof. For example, the specific mean, covariance and composition weight of the Gaussian distribution may be calculated for example by using Expectation Maximization (EM) Algorithm.

Alternatively, when calculating the Gaussian Mixture Model of a geometric primitive belonging to planar or cube primitives, the boundary of the geometric primitive may be used to generate a quadtree or octree partition of the geometric primitive. Then a Gaussian distribution may be put into each blank cell which is located within the geometric primitive, thereby forming the Gaussian Mixture Model of the geometric primitive. The number of partitions, that is, the number of Gaussian distributions within the Gaussian Mixture Model may depend on accuracy requirement. It is clear that the mean of each Gaussian distribution put into each black cell is the center of the blank cell. Moreover, the covariance of each Gaussian distribution can be determined based on the geometric parameters of the corresponding black cell. Additionally, the composition weights of Gaussian distributions may be determined by the area ratios between corresponding black cells.

It is contemplated that Gaussian Mixture Models in several accuracy levels may be calculated for a geometric primitive and stored for later use. Taking a triangle primitive as an example, through using the quadtree algorithm, the triangle primitive may be expressed by a Gaussian Mixture Model with one Gaussian distribution, a Gaussian Mixture Model with four Gaussian distributions, or a Gaussian Mixture Model with eleven Gaussian distributions, which may depend on accuracy requirement.

In another example, the Gaussian Mixture Model for a point cluster may also be calculated by using the boundary of the point cluster to generate a quadtree partition of the cluster, and then putting a Gaussian distribution into each blank cell which is located within the point cluster. As an alternative, the Gaussian Mixture Model for a point cluster may be generated by using points within the point cluster to calculate the Gaussian Mixture Model thereof, for example by using EM method.

The signature for identifying the point cluster may comprise properties of the point cluster. For example, the properties of the point cluster may comprise type, length, width, thickness, orientation, the ration of main axes, reflectivity or flatness of the point cluster. In an example, the signature may be constructed as a vector comprising the properties of the point cluster. It is also contemplated that properties other than those mentioned above can be used to construct the signature.

Thus, the SGM model may comprise the Gaussian Mixture Model and the signature of the point cluster. Representing the point cluster with the SGM model will reduce the storage requirement as well as improve tolerance on noise.

Figure 3A:
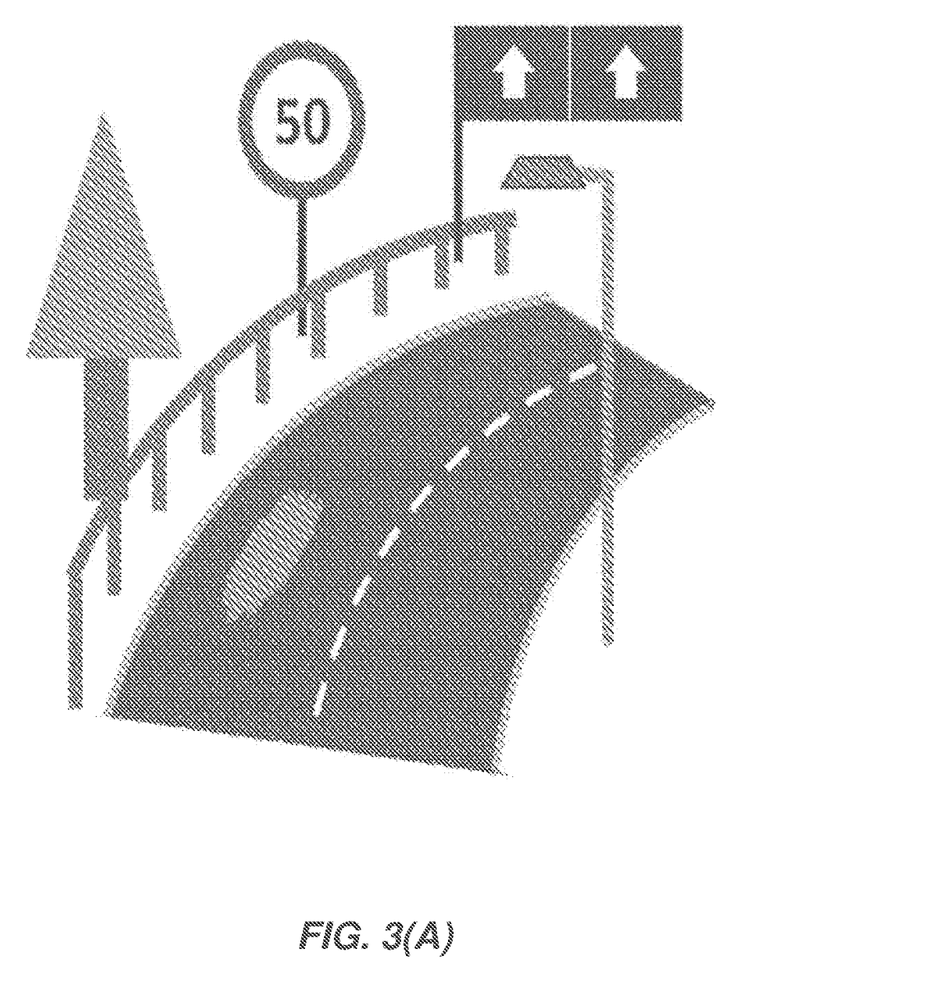
Figure 3B:
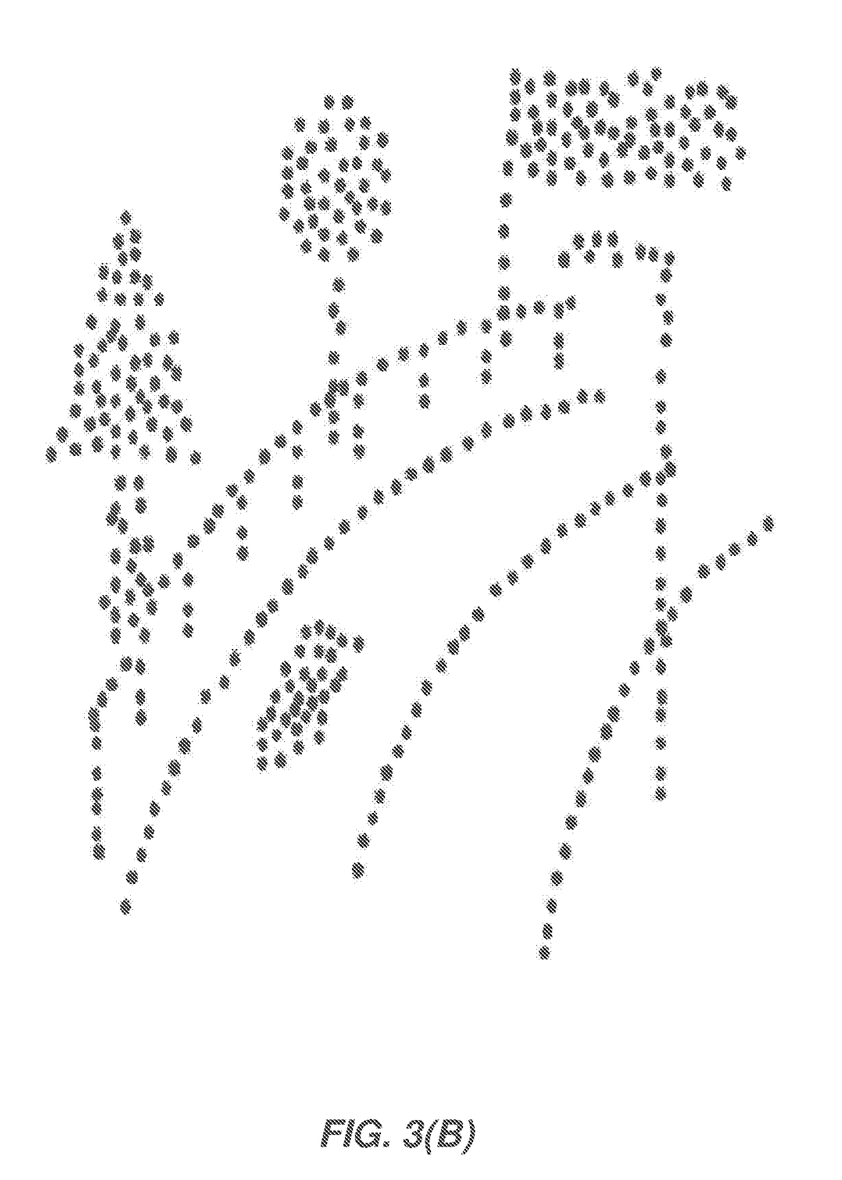
Figure 3C:
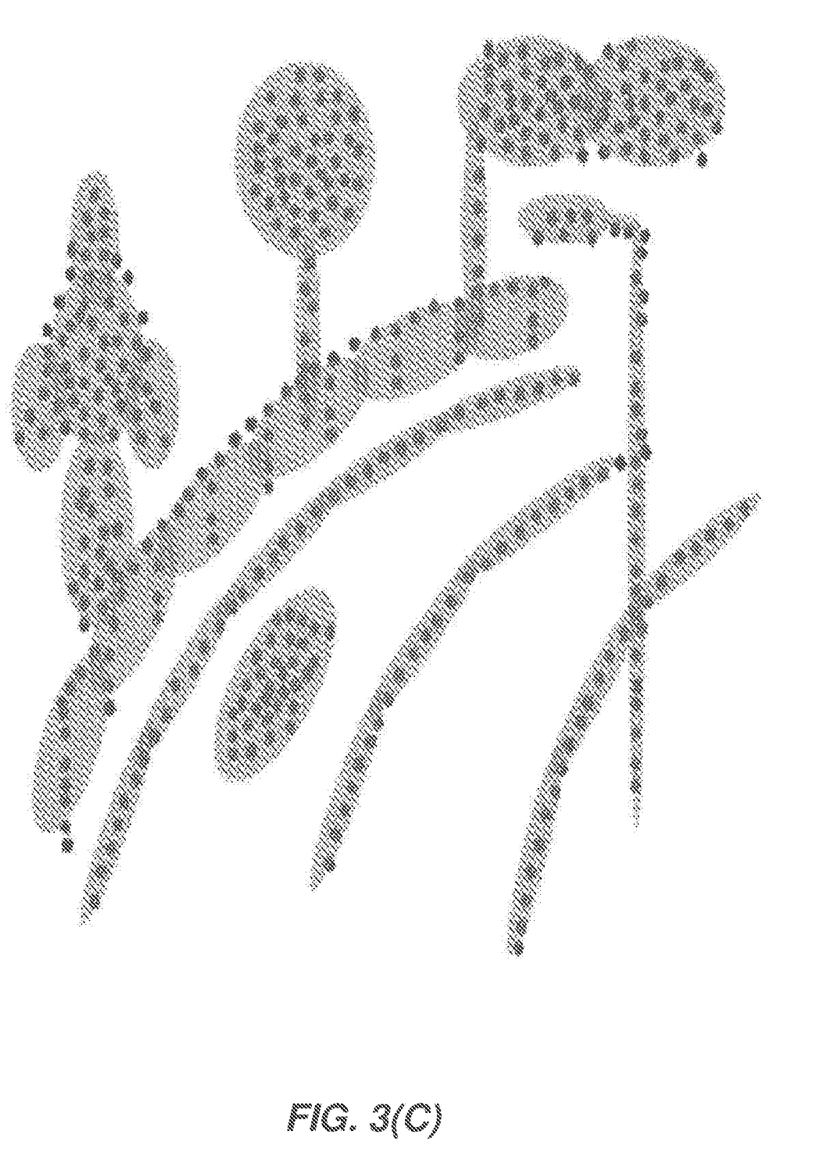
Figure 4:
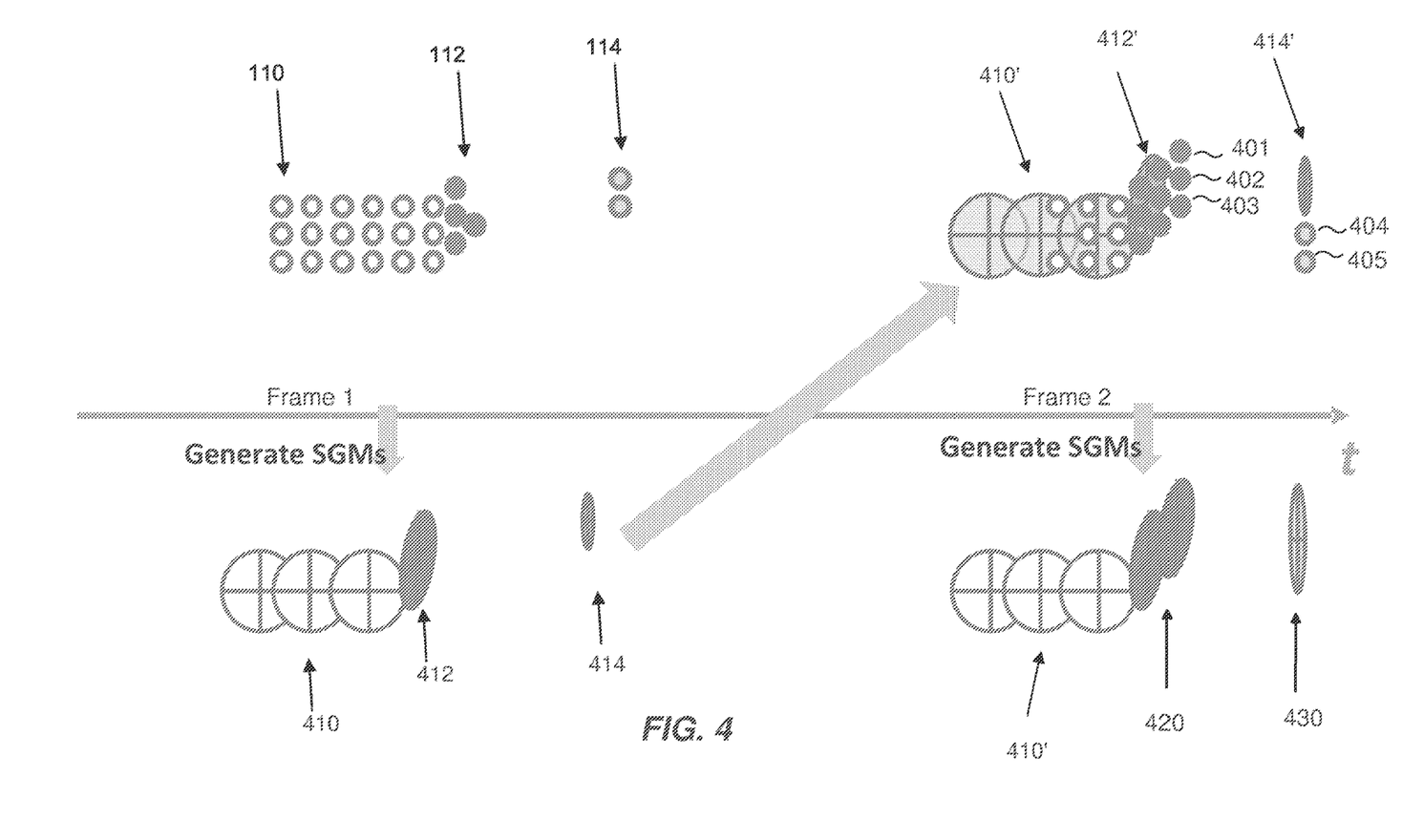
FIG. 4 illustrates another example of incremental segmentation of a point cloud in accordance with an exemplary embodiment of the present disclosure.

FIG. 3 (A) shows a portion of a ground truth with several objects, such as a tree with a crown and a trunk, a speed limit board with a post, a directional board with a post, a road lamp with a post and a holder etc. FIG. 3 (B) shows a point cloud with several point clusters. For example, the point cloud may be obtained by a lidar installed on the top of the vehicle. FIG. 3 (C) shows an illustrative diagram of representing point clusters in the point cloud using the SGM model. As shown in FIG. 3 (C), point clusters in the point cloud have been represented by Signatured Gaussian Mixture models respectively FIG. 4 illustrates another example of incremental segmentation of a point cloud in accordance with an exemplary embodiment of the present disclosure. As shown on the left side of FIG. 4, after points within the first frame of the point cloud "Frame 1" have been segmented into three point clusters 110, 112 and 114, SGM models 410, 412 and 414 are generated to represent these point clusters using the method as discussed above. For example, the first SGM model 410, which is illustratively shown with three circles, represents the first point cluster 110; the second SGM model 412, which is illustratively shown with one ellipse, represents the second point cluster 112; and the third SGM model 414, which is illustratively shown with one ellipse, represents the third point cluster 114. Each of the SGM models 410, 412 and 414 has a signature of properties for the corresponding point cluster. The signature may comprise length, width, thickness, orientation, ratio of main axes, reflectivity and/or flatness for the corresponding point cluster.

Next, after the second frame of point cloud "Fame 2" is obtained by the sensor, the SGM Models 410, 412 and 414 in Frame 1 may be mapped to Frame 2 according to a coordinate transformation based on their coordinate information, as similarly described with reference to FIG. 2. The mapped SGM models are denoted with the reference number 410', 412' and 414' in FIG. 4. As can be seen on the right side of FIG. 4, 8 points in Frame 2 overlap with the mapped first SGM model 410', and 6 points in Frame 2 overlap with the mapped second SGM model 412'. Therefore, only points 401, 402, 403, 404 and 405 in Frame 2 need to be segmented. After the segmentation, points 401, 402 and 403 are segmented into a fourth point cluster, and points 404 and 405 are segmented into a fifth point cluster. A fourth SGM model is then generated to represent the fourth point cluster, and a fifth SGM model is generated to represent the fifth point cluster. It may be determined whether the fourth SGM Model and/or the fifth SGM model may be merged with the mapped SGM models 410', 412' and 414'. Such determination may be based on the comparison of the signatures of these SGM models. For example, if the mapped second SGM model is close to the fourth SGM model and their signatures show that they have very similar flatness, then these two SGM models may be merged to one SGM model 420. As another example, if the mapped third SGM model is close to the fifth SGM model and their signatures show that they have very similar orientation, then these two SGM models may be merged to one SGM model 430. The resulting SGM models 410', 420 and 430 may represent the segmentation result for Frame 2.

Figure 5:
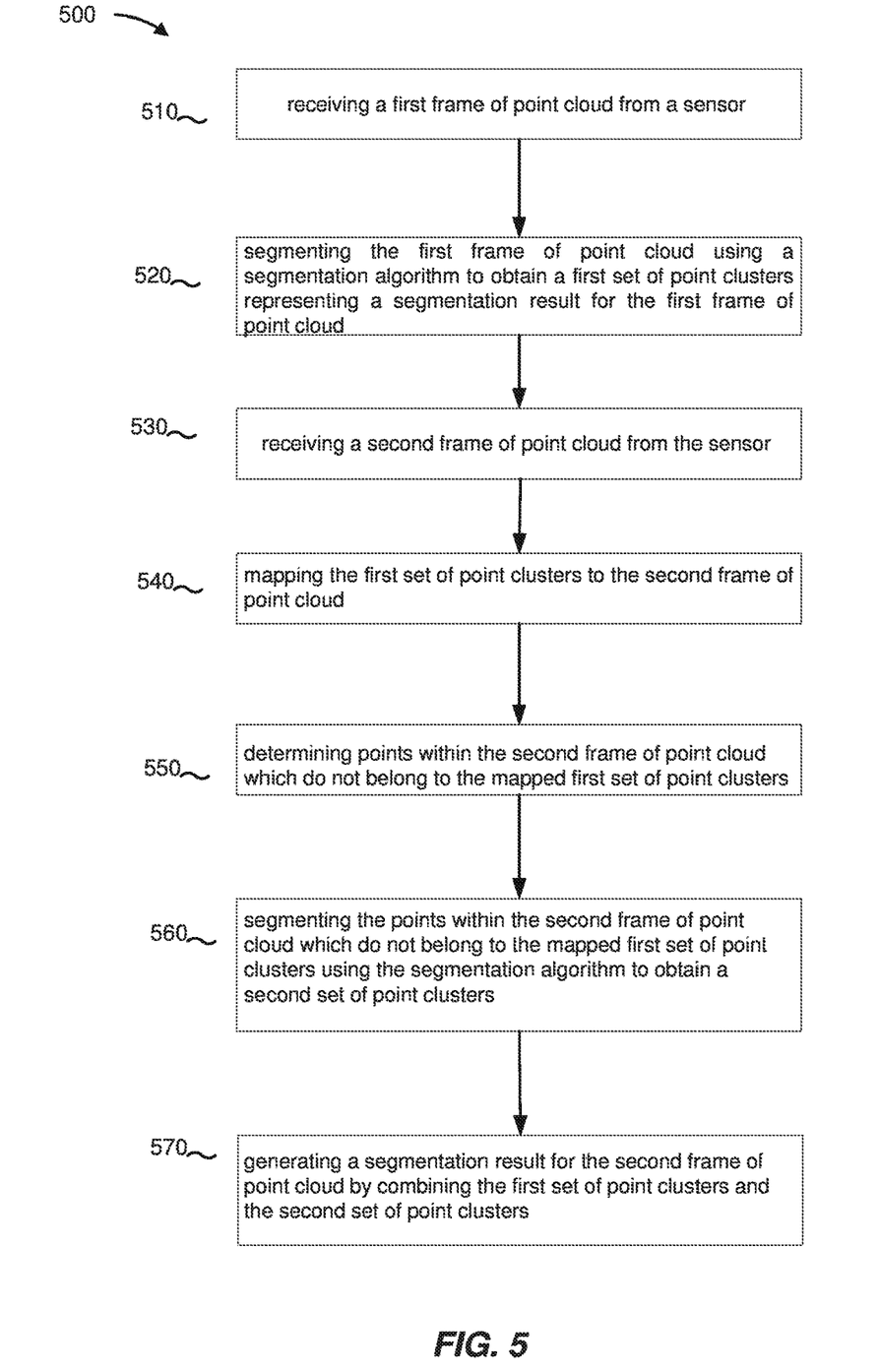
FIG. 5 illustrates a flowchart of an exemplary method for segmentation of a point cloud in accordance with an exemplary embodiment of the present disclosure.

FIG. 5 illustrates a flowchart of an exemplary method 500 for segmentation of a point cloud in accordance with an exemplary embodiment of the present disclosure. For example, the method 500 may be implemented within at least one processing circuit (e.g., the processor 804 of FIG. 8), which may be located in an on-vehicle computer system, a remote server, some other suitable apparatus, or a combination of these apparatuses. Of course, in various aspects within the scope of the disclosure, the method 500 may be implemented by any suitable apparatus or apparatuses capable of supporting related operations.

At block 510, a first frame of point cloud (e.g. Frame 1 in FIG. 1) may be received from a sensor. The sensor may comprise a lidar, a stero-camera, a time-of-flight camera, or any other device which is capable of generating a point cloud. In an example, the sensor may be installed on the top of a vehicle and may rotate in a plane (e.g. the X-Y plane in a Cartesian coordinate system). In an example, the sensor may generate tens or hundreds of frames of point cloud every second, wherein each point within the point cloud has a three dimensional coordinate (x, y, z) and/or other information (e.g. the color, the reflection intensity, the normal direction, etc.).

At block 520, the first frame of point cloud may be segmented using a segmentation algorithm to obtain a first set of point clusters (e.g. point clusters 110, 112 and 114 in FIG. 1) representing a segmentation result for the first frame of point cloud. In an example, the segmentation algorithm may comprise the K-means algorithm, the K-NearestNeighbor algorithm, the GMM algorithm and/or the region growing algorithm. In an example, the growing criteria of the region growing algorithm may be defined based on attributes of points within a point cloud. For example, such attributes may comprise at least one of: a distance of two neighboring points, a similarity of normal directions of two neighboring points, or a similarity of a reflection rate of points. In an example, the distance of two neighboring points may be less than 0.5 m, in particular less than 5 cm, the similarity of normal directions of two neighboring points may be less than 1 degree, in particular less than 0.1 degree, and the similarity of a reflection rate of points may be less than 10%.

In an aspect of the present disclosure, each of the first set of point clusters may be represented by a respective SGM model. As shown in FIG. 4, the first set of point clusters 110, 112 and 114 may be represented by the first set of SGM models 410, 412 and 414. Each SGM model may comprise a signature representing properties of a corresponding point cluster, wherein the properties may comprise length, width, thickness, orientation, ratio of main axes, reflectivity and/or flatness for the corresponding point cluster.

At block 530, a second frame of point cloud (e.g. Frame 2 in FIG. 1) may be received from the sensor. The second frame of point cloud and the first frame of point cloud may be two consecutive frames of point cloud obtained by the sensor sequentially in time and may have a lot of overlap.

At block 540, the first set of point clusters may be mapped to the second frame of point cloud. In an example, such mapping may be performed according to a coordinate transformation. For example, the coordinate transformation may be based on the coordinate information of the points within the first set of point clusters and the relative relationship between the Cartesian coordinate system of the first frame of point cloud and the Cartesian coordinate system of the second frame of point cloud. In another example, the coordinate information of all points within the first and second frames of point cloud may be transformed into coordinate information (e.g., longitude, latitude, altitude) in a common global coordinate system for further processing. In the embodiment shown in FIG. 2, the mapped first set of point clusters are referred to as point clusters 110', 112' and 114'.

In an aspect of the present disclosure, the mapping at block 540 may comprise mapping the first set of SGM models to the second frame of point cloud. For example, referring to FIG. 4, the mapped first set SGM models are labeled as 410', 412' and 414'.

At block 550, points within the second frame of point cloud which do not belong to the mapped first set of point clusters may be determined. Such determination may be based on the coordinate information of points within the second frame of point cloud. For example, as shown in FIG. 2, since points within the dashed circle 240 and points within the dashed circle 230 do not overlap with any of the mapped first set of point clusters, these points do not belong to any of the mapped first set of point clusters.

In an aspect of the present disclosure, the determining at block 550 may comprise determining points within the second frame of point cloud which do not belong to the mapped first set of SGM models. For example, as shown in FIG. 4, points 401, 402, 403, 404 and 405 do not belong to the mapped first set of SGM models 410', 412' and 414'.

At block 560, the points within the second frame of point cloud which do not belong to the mapped first set of point clusters may be segmented using the segmentation algorithm to obtain a second set of point clusters (e.g. point clusters 240 and 230 in FIG. 2).

In an aspect of the present disclosure, the segmenting at block 560 may comprise segmenting the points within the second frame of point cloud which do not belong to the mapped first set of SGM models using the segmentation algorithm to obtain a second set of point clusters. In an example, the second set of point clusters may be represented using a second set of SGM models.

At block 570, the segmentation result for the second frame of point cloud may be generated by combining the first set of point clusters and the second set of point clusters. The combination may be based on comparing the attributes of the first and second set of point clusters. The attributes may comprise length, width, thickness, orientation, ratio of main axes, reflectivity and/or flatness for the corresponding point cluster. For example, as shown in FIG. 2, the point clusters 114' and 230 are close to each other and their points have similar flatness, thus these two point clusters may be merged into one point cluster 260. The point clusters 112' and 240 are close to each other and their points have similar reflection rate. Therefore, these two point clusters may be combined into one point cluster 250. Finally, there are totally three point clusters 110', 250 and 260 which represent the segmentation result of Frame 2.

In an aspect of the present disclosure, the generating at block 570 may comprise generating the segmentation result for the second frame of point cloud by combining the first set of SGM models and the second set of SGM models. Such combining may comprise comparing a signature of each of the first set of SGM models with a signature of each of the second set of SGM models; and merging the first set of SGM models and the second set of SGM models based on the comparison.

Optionally, after the operation at block 570 is executed, a third frame of point cloud may be received from the sensor and similar operations may be performed on the third frame of point cloud.

By using the method described in FIG. 5, only un-overlapped points in a new frame of point cloud are segmented. Therefore, substantial processing resources may be saved. In addition, potential correlated information among frames of point cloud may be preserved.

Figure 6:
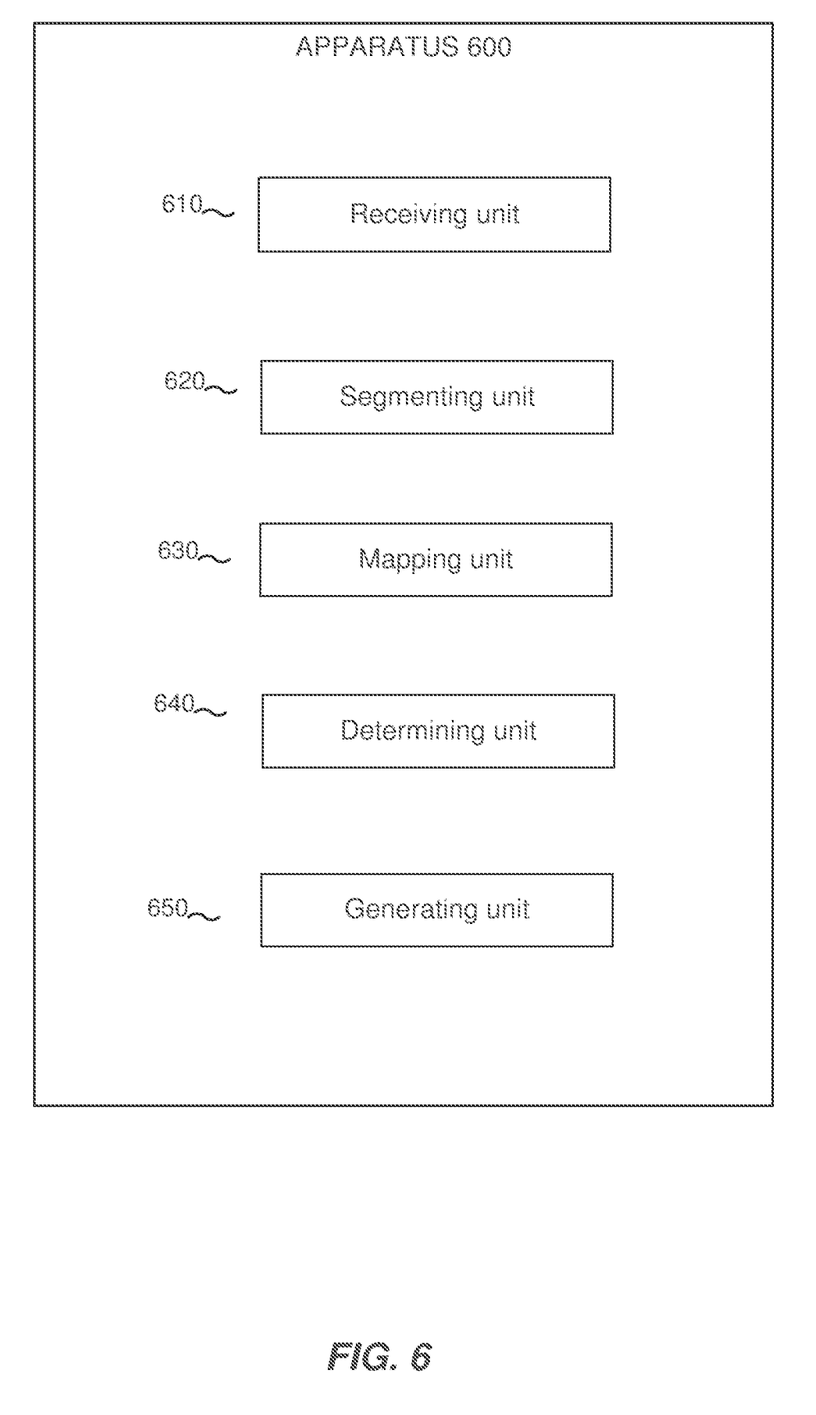
FIG. 6 illustrates a block diagram of an exemplary apparatus for segmentation of a point cloud in accordance with an exemplary embodiment of the present disclosure.

FIG. 6 illustrates a block diagram of an exemplary apparatus 600 for segmentation of a point cloud in accordance with an exemplary embodiment of the present disclosure. All the functional blocks of the apparatus 600 (various units included in the apparatus 600, whether shown or not shown in the figure) may be implemented by hardware, software, or a combination of hardware and software to carry out the principles of the invention. It is understood by those skilled in the art that the functional blocks described in FIG. 6 may be combined or separated into sub-blocks to implement the principles of the invention as described above. Therefore, the description herein may support any possible combination or separation or further definition of the functional blocks described herein.

As shown in FIG. 6, according to an exemplary embodiment of the present disclosure, the apparatus 600 for segmentation of a point cloud may comprise: a receiving unit 610 configured to receive a first frame of point cloud from a sensor: a segmenting unit 620 configured to segment the first frame of point cloud using a segmentation algorithm to obtain a first set of point clusters representing a segmentation result for the first frame of point cloud: the receiving unit 610 further configured to receive a second frame of point cloud from the sensor; a mapping unit 630 configured to map the first set of point clusters to the second frame of point cloud; a determining unit 640 configured to determine points within the second frame of point cloud which do not belong to the mapped first set of point clusters: the segmenting unit 620 further configured to segment the points within the second frame of point cloud which do not belong to the mapped first set of point clusters using the segmentation algorithm to obtain a second set of point clusters; and a generating unit 650 configured to generate a segmentation result for the second frame of point cloud by combining the first set of point clusters and the second set of point clusters.

Figure 7:
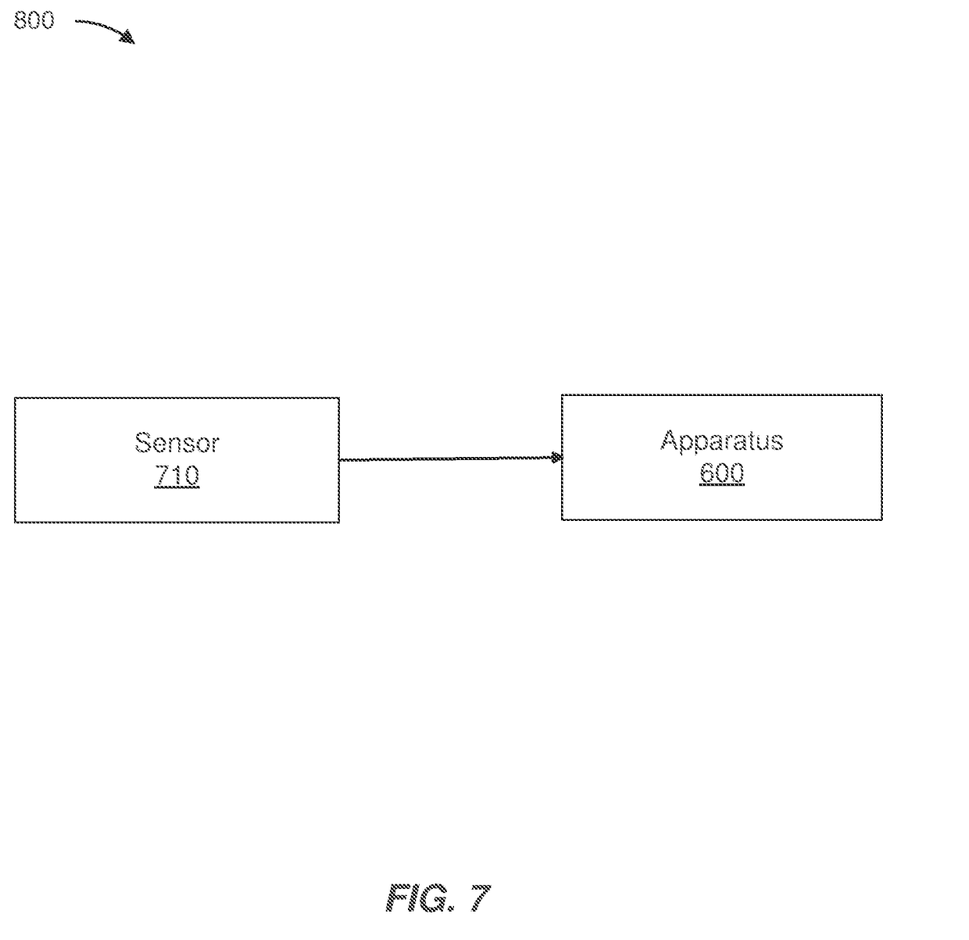
FIG. 7 illustrates a block diagram of an exemplary system for use in a vehicle in accordance with an exemplary embodiment of the present disclosure.

FIG. 7 illustrates a block diagram of an exemplary system 700 for use in a vehicle in accordance with an exemplary embodiment of the present disclosure. The system 700 may comprise a sensor 710 and the apparatus 600 for segmentation of a point cloud. The sensor 710 may comprise a lidar, a stero-camera, a time-of-flight camera, or any other device which is capable of generating a point cloud. The sensor 710 may generate tens or hundreds of frames of point cloud every second and provide the frames of point cloud to the apparatus 600. The system 700 may be installed anywhere in a vehicle.

Figure 8:
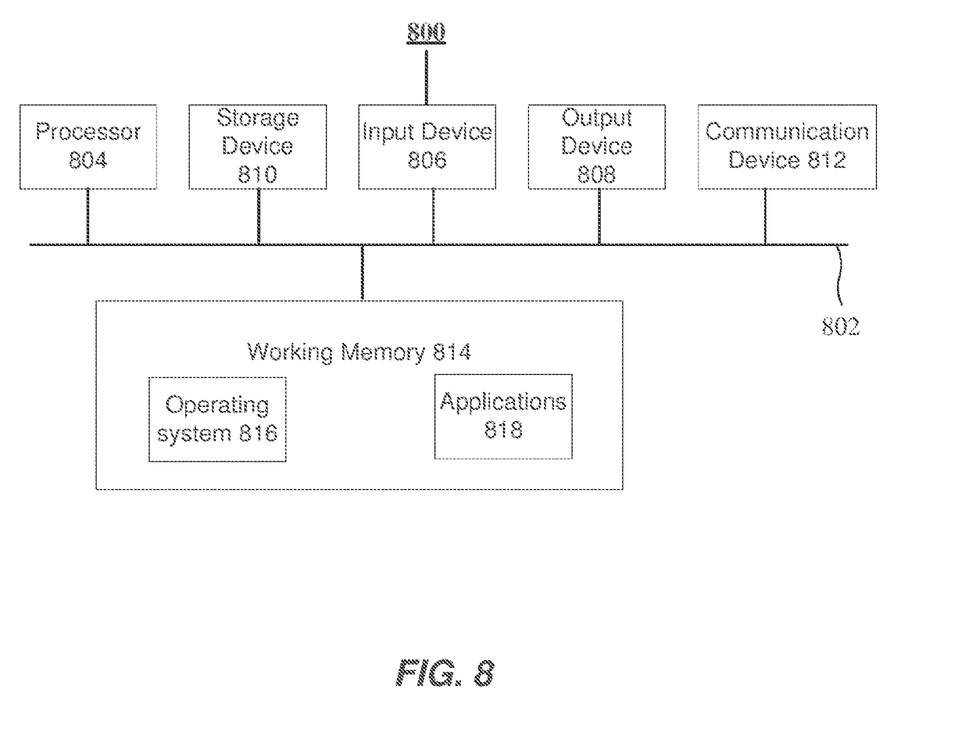
FIG. 8 illustrates a general hardware environment wherein the present disclosure is applicable in accordance with an exemplary embodiment of the present disclosure.

FIG. 8 illustrates a general hardware environment wherein the present disclosure is applicable in accordance with an exemplary embodiment of the present disclosure.

With reference to FIG. 8, a computing device 800, which is an example of the hardware device that may be applied to the aspects of the present disclosure, will now be described. The computing device 800 may be any machine configured to perform processing and/or calculations, may be but is not limited to a work station, a server, a desktop computer, a laptop computer, a tablet computer, a personal data assistant, a smart phone, an on-vehicle computer or any combination thereof. The aforementioned apparatus 600 may be wholly or at least partially implemented by the computing device 800 or a similar device or system.

The computing device 800 may comprise elements that are connected with or in communication with a bus 802, possibly via one or more interfaces. For example, the computing device 800 may comprise the bus 802, and one or more processors 404, one or more input devices 806 and one or more output devices 808. The one or more processors 804 may be any kinds of processors, and may comprise but are not limited to one or more general-purpose processors and/or one or more special-purpose processors (such as special processing chips). The input devices 806 may be any kinds of devices that can input information to the computing device, and may comprise but are not limited to a mouse, a keyboard, a touch screen, a microphone and/or a remote control. The output devices 808 may be any kinds of devices that can present information, and may comprise but are not limited to display, a speaker, a video/audio output terminal, a vibrator and/or a printer. The computing device 800 may also comprise or be connected with non-transitory storage devices 810 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 810 may be detachable from an interface. The non-transitory storage devices 810 may have data/instructions/code for implementing the methods and steps which are described above. The computing device 800 may also comprise a communication device 812. The communication device 812 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device. WiFi device, WiMax device, cellular communication facilities and/or the like.

When the computing device 800 is used as an on-vehicle device, it may also be connected to external device, for example, a GPS receiver, sensors for sensing different environmental data such as an acceleration sensor, a wheel speed sensor, a gyroscope and so on. In this way, the computing device 800 may, for example, receive location data and sensor data indicating the travelling situation of the vehicle. When the computing device 800 is used as an on-vehicle device, it may also be connected to other facilities (such as an engine system, a wiper, an anti-lock Braking System or the like) for controlling the traveling and operation of the vehicle.

In addition, the non-transitory storage device 810 may have map information and software elements so that the processor 804 may perform route guidance processing. In addition, the output device 806 may comprise a display for displaying the map, the location mark of the vehicle and also images indicating the travelling situation of the vehicle. The output device 806 may also comprise a speaker or interface with an ear phone for audio guidance.

The bus 802 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 802 may also include a Controller Area Network (CAN) bus or other architectures designed for application on an automobile.

The computing device 800 may also comprise a working memory 814, which may be any kind of working memory that may store instructions and/or data useful for the working of the processor 804, and may comprise but is not limited to a random access memory and/or a read-only memory device.

Software elements may be located in the working memory 814, including but are not limited to an operating system 816, one or more application programs 818, drivers and/or other data and codes. Instructions for performing the methods and steps described in the above may be comprised in the one or more application programs 818, and the units of the aforementioned apparatus 600 may be implemented by the processor 804 reading and executing the instructions of the one or more application programs 818. More specifically, the segmenting unit 620 of the aforementioned apparatus 600 may, for example, be implemented by the processor 804 when executing an application 818 having instructions to perform the block 520. In addition, the determining unit 640 of the aforementioned apparatus 600 may, for example, be implemented by the processor 804 when executing an application 818 having instructions to perform the block 550. Other units of the aforementioned apparatus 600 may also, for example, be implemented by the processor 804 when executing an application 818 having instructions to perform one or more of the aforementioned respective steps. The executable codes or source codes of the instructions of the software elements may be stored in a non-transitory computer-readable storage medium, such as the storage device (s) 810 described above, and may be read into the working memory 814 possibly with compilation and/or installation. The executable codes or source codes of the instructions of the software elements may also be downloaded from a remote location.

Those skilled in the art may clearly know from the above embodiments that the present disclosure may be implemented by software with necessary hardware, or by hardware, firmware and the like. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

Reference has been made throughout this specification to "one example" or "an example", meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method for segmentation of a point cloud, comprising:
receiving a first frame of point cloud from a sensor;
segmenting the first frame of point cloud using a segmentation algorithm to obtain a first set of point clusters representing a segmentation result for the first frame of point cloud, wherein each of the first set of point clusters is represented using one of a first set of Signatured Gaussian Mixture Models, wherein each Signatured Gaussian Mixture Model comprises a signature representing properties of a respective point cluster;
receiving a second frame of point cloud from the sensor;
mapping the first set of Signatured Gaussian Mixture Models to the second frame of point cloud according to a coordinate transformation based on their coordinate information;
determining points within the second frame of point cloud which do not belong to the mapped first set of Signatured Gaussian Mixture Models;
segmenting the points within the second frame of point cloud which do not belong to the mapped first set of Signatured Gaussian Mixture Models using the segmentation algorithm to obtain a second set of point clusters, wherein each of the second set of point clusters is represented using one of a second set of Signatured Gaussian Mixture Models; and
generating a segmentation result for the second frame of point cloud by combining the first set of Signatured Gaussian Mixture Models and the second set of Signatured Gaussian Mixture Models, wherein the generating comprises:
comparing a signature of each of the first set of signatured Gaussian Mixture Models with a signature of each of the second set of signatured Gaussian Mixture Models; and
merging the first set of signatured Gaussian Mixture Models and the second set of signatured Gaussian Mixture Models based on the comparison.

2. The method according to claim 1, wherein the segmentation algorithm comprises a region growing algorithm, and wherein a growing criteria of the region growing algorithm is defined based on attributes of points within a point cloud.

3. The method according to claim 2, wherein the attributes of points within a point cloud comprises at least one of: a distance of two neighboring points, a similarity of normal directions of two neighboring points, or a similarity of a reflection rate of points.

4. The method according to claim 3, wherein the distance of two neighboring points is less than 0.5 m, wherein the similarity of normal directions of two neighboring points is less than 1 degree, and wherein the similarity of a reflection rate of points is less than 10%.

5. The method according claim 1, wherein the properties comprise length, width, thickness, orientation, ratio of main axes, reflectivity and/or flatness for the corresponding point cluster.

6. The method according to claim 1, wherein the sensor comprises at least one of: lidar, stero-camera or time-of-flight camera.

7. A non-transitory machine readable storage medium having instructions stored thereon that, when executed, cause a processor to implement the method according to claim 1.

8. An apparatus for segmentation of a point cloud, comprising a processor further comprising:
a receiving unit configured to receive a first frame of point cloud from a sensor;
a segmenting unit configured to segment the first frame of point cloud using a segmentation algorithm to obtain a first set of point clusters representing a segmentation result for the first frame of point cloud, wherein each of the first set of point clusters is represented using one of a first set of Signatured Gaussian Mixture Models, wherein each Signatured Gaussian Mixture Model comprises a signature representing properties of a respective point cluster;

the receiving unit further configured to receive a second frame of point cloud from the sensor;

a mapping unit configured to map the first set of Signatured Gaussian Mixture Models to the second frame of point cloud according to a coordinate transformation based on their coordinate information;

a determining unit configured to determine points within the second frame of point cloud which do not belong to the mapped first set of Signatured Gaussian Mixture Models;

the segmenting unit further configured to segment the points within the second frame of point cloud which do not belong to the mapped first set of Signatured Gaussian Mixture Models using the segmentation algorithm to obtain a second set of point clusters, wherein each of the second set of point clusters is represented using one of a second set of Signatured Gaussian Mixture Models; and a generating unit configured to generate a segmentation result for the second frame of point cloud by combining the first set of Signatured Gaussian Mixture Models and the second set of Signatured Gaussian Mixture Models, wherein the generating unit is configured to generate the segmentation result by:

comparing a signature of each of the first set of signatured Gaussian Mixture Models with a signature of each of the second set of signatured Gaussian Mixture Models; and merging the first set of signatured Gaussian Mixture Models and the second set of signatured Gaussian Mixture Models based on the comparison.

9. A system for use in a vehicle, comprising:
a sensor; and
an apparatus for segmentation of a point cloud according to claim 8.

10. A vehicle comprising the system according to claim 9.

11. An apparatus for segmentation of a point cloud, comprising:

a memory with computer executable instructions stored therein; and a processor, coupled to the memory and configured to:
receive a first frame of point cloud from a sensor;
segment the first frame of point cloud using a segmentation algorithm to obtain a first set of point clusters representing a segmentation result for the first frame of point cloud, wherein each of the first set of point clusters is represented using one of a first set of Signatured Gaussian Mixture Models, wherein each Signatured Gaussian Mixture Model comprises a signature representing properties of a respective point cluster;

receive a second frame of point cloud from the sensor;

map the first set of Signatured Gaussian Mixture Models to the second frame of point cloud according to a coordinate transformation based on their coordinate information;

determine points within the second frame of point cloud which do not belong to the mapped first set of Signatured Gaussian Mixture Models;

segment the points within the second frame of point cloud which do not belong to the mapped first set of Signatured Gaussian Mixture Models using the segmentation algorithm to obtain a second set of point clusters, wherein each of the second set of point clusters is represented using one of a second set of Signatured Gaussian Mixture Models; and generate a segmentation result for the second frame of point cloud by combining the first set of Signatured Gaussian Mixture Models and the second set of Signatured Gaussian Mixture Models by:

comparing a signature of each of the first set of signatured Gaussian Mixture Models with a signature of each of the second set of signatured Gaussian Mixture Models; and merging the first set of signatured Gaussian Mixture Models and the second set of signatured Gaussian Mixture Models based on the comparison.

* * * * *